United States Patent
Boyd et al.

(10) Patent No.: US 12,110,417 B2
(45) Date of Patent: Oct. 8, 2024

(54) HEAT RESISTANT PAPER-FEEL OVERPRINT VARNISHES

(71) Applicant: SUN CHEMICAL CORPORATION, Parsippany, NJ (US)

(72) Inventors: Craig Boyd, Northlake, IL (US); David Majewski, Northlake, IL (US)

(73) Assignee: Sun Chemical Corporation, Parsippany, NJ (US)

( * ) Notice: Subject to any disclaimer, the term of this patent is extended or adjusted under 35 U.S.C. 154(b) by 518 days.

(21) Appl. No.: 17/296,397

(22) PCT Filed: Dec. 11, 2019

(86) PCT No.: PCT/US2019/065635
§ 371 (c)(1),
(2) Date: May 24, 2021

(87) PCT Pub. No.: WO2020/123599
PCT Pub. Date: Jun. 18, 2020

(65) Prior Publication Data
US 2022/0127473 A1    Apr. 28, 2022

Related U.S. Application Data

(60) Provisional application No. 62/777,915, filed on Dec. 11, 2018.

(51) Int. Cl.
| | |
|---|---|
| *C09D 5/18* | (2006.01) |
| *B41M 7/00* | (2006.01) |
| *C09D 7/20* | (2018.01) |
| *C09D 7/40* | (2018.01) |
| *C09D 7/65* | (2018.01) |
| *C09D 11/033* | (2014.01) |
| *C09D 11/037* | (2014.01) |
| *C09D 11/102* | (2014.01) |
| *C09D 11/14* | (2006.01) |
| *C09D 101/16* | (2006.01) |
| *C09D 171/00* | (2006.01) |
| *C09D 175/04* | (2006.01) |
| *D21H 19/52* | (2006.01) |
| *D21H 19/62* | (2006.01) |
| *D21H 19/66* | (2006.01) |

(52) U.S. Cl.
CPC ............ *C09D 5/18* (2013.01); *B41M 7/0027* (2013.01); *C09D 7/20* (2018.01); *C09D 7/65* (2018.01); *C09D 7/68* (2018.01); *C09D 7/69* (2018.01); *C09D 11/033* (2013.01); *C09D 11/037* (2013.01); *C09D 11/102* (2013.01); *C09D 11/14* (2013.01); *C09D 101/16* (2013.01); *C09D 171/00* (2013.01); *C09D 175/04* (2013.01); *D21H 19/52* (2013.01); *D21H 19/62* (2013.01); *D21H 19/66* (2013.01)

(58) Field of Classification Search
CPC ... C09D 5/18; C09D 7/65; C09D 7/69; C09D 7/20; C09D 7/68; C09D 11/102; C09D 11/14; D21H 19/52; D21H 19/62; D21H 19/66
USPC .......................................................... 162/135
See application file for complete search history.

(56) References Cited

U.S. PATENT DOCUMENTS 5,143,782 A * 9/1992 Morishima ............... B41M 5/42
                                                                 347/217
5,462,911 A * 10/1995 Takao ...................... B41M 5/52
                                                                 503/227

FOREIGN PATENT DOCUMENTS

EP      0 387 454 A2    9/1990

OTHER PUBLICATIONS

All About Nylon Material: Properties, Types, Pro And Cons, 2021, Application, Wayken Rapid Manufacturing, [online], retrieved from the Internet,[retrieved Mar. 14, 2024], <URL:https://waykenrm.com/blogs/nylon-material-guide-properties-types-pros-and-cons-application/> (Year: 2021).*
International Search Report issued in International Application No. PCT/US19/65635, mailed Mar. 12, 2020.
Written Opinion of the International Searching Authority issued in International Application No. PCT/US19/65635, mailed Mar. 12, 2020.
International Preliminary Report on Patentability (Chapter 1 of the Patent Cooperation Treaty) issued in International Application No. PCT/US19/65635, mailed Jan. 8, 2021.

* cited by examiner

*Primary Examiner* — Dennis R Cordray
(74) *Attorney, Agent, or Firm* — Marian E. Fundytus; Ostrolenk Faber LLP.

(57) ABSTRACT

Described herein are heat resistant inks and coating compositions that, when coated on a substrate, impart the feel of paper. The inks and coating compositions do not degrade when exposed to temperatures of 120° C. or greater.

19 Claims, No Drawings

HEAT RESISTANT PAPER-FEEL OVERPRINT VARNISHES

CROSS REFERENCE TO RELATED APPLICATIONS

The present application is a § 371 National Phase application based on PCT/US2019/065635 filed Dec. 11, 2019, which claims the benefit of U.S. Provisional Application No. 62/777,915, filed Dec. 11, 2018 the subject matter of each of which is incorporated by reference in their entirety.

FIELD OF THE INVENTION

The present invention is directed to the field of inks and coatings, such as those suitable for printing on packaging materials, such as plastic films.

BACKGROUND OF THE INVENTION

There appears to be a lack of coating technology that alters how an article is perceived when it is touched or felt, such as for example altering the haptic or tactile perception so that the article feels like something different from what it is. For example, there is an absence of coating technology that can be used to make a plastic material feel like something else, such as feeling like paper. Also, the current haptic effect technology exhibits poor heat resistance and breaks down when exposed to high temperatures, which means that the coatings cannot be used in heat stamping and cannot be printed at high temperatures on, for example roto-gravure and flexo printing presses. Such heat stamping and printing operations may take place above 200° C. (392° F.). Roto-gravure and flexo are employed in printing packaging materials, such as plastic packaging materials.

It would be advantageous to provide an ink or coating, such as an overprint varnish (OPV), which provides a paper-like feel to the substrate on which it is coated. In other words, the coating would provide a haptic effect or tactile perception of feeling paper. It would further advantageous if the coating created the haptic effect or tactile perception of feeling paper, even if the substrate material is something other than paper (e.g., it is plastic). Further, it would be advantageous if the coating resists and withstands temperatures encountered in printing processes, such as temperatures of 120° C. or greater.

Because current paper-feel coatings exhibit poor heat resistance and break down at high temperatures, they cannot be used effectively on heat seal pouches and bags, because the haptic or tactile perception provided by the coating is lost in the area where the pouch or bag is heat sealed. That is, the heat applied there causes the coating to degrade. This leaves areas where the bag feels like plastic instead of paper.

Available coatings that simulate paper feel achieve the paper-feel effect through being patterned applied. Application in a pattern simulates the irregular feel of paper by creating a contrasting surface dynamic between the uncoated portion and the coated portion of the substrate. Pattern application provides a convincing paper-like feel through being flood coated. Pattern applying a coating requires a specially made cylinder which is costly and takes time to manufacture.

It would further be advantageous if the coating is a one-part ink or coating composition, that is, a composition that is received by the customer in a ready-to-use state. For example, the one-part product does not require the customer to add further components to the coating to render it effective for use.

SUMMARY OF THE INVENTION

The present application is drawn to heat resistant inks or coating compositions that comprise resin, solvent and a heat resistant material, wherein the ink or coating compositions, when coated on a substrate, impart a feel of paper, and wherein the ink or coating compositions do not degrade when exposed to temperatures of 120° C. or greater.

In one aspect, the inks or coating compositions do not degrade when exposed to temperatures of 120° C. to at least 240° C., preferably 120° C. to at least 250° C., and more preferably, 120° C. to at least 267° C.

In one aspect, the inks or coating compositions do not degrade when exposed to temperatures of 120° C. to 267° C.

In one aspect, the heat resistant material comprises nylon particles.

In one aspect, the heat resistant material comprises particles of nylon selected from nylon 6 particles, nylon 66 particles, nylon 610 particles, nylon 612 particles, and combinations thereof.

In one aspect, the heat resistant material comprises nylon 66, which may be nylon 66 particles.

In one aspect, the heat resistant material is nylon 66 particles, which may be nylon 66 particles.

In one aspect, the heat resistant material comprises nylon particles having a maximum particle size of 100 μm or less.

In one aspect, the heat resistant material comprises nylon particles having a maximum particle size of 0.1 μm to 100 μm.

In one aspect, the heat resistant material comprises nylon particles having a mean particle size of 25 μm to 75 μm.

In one aspect, the heat resistant material comprises nylon particles having a mean particle size of 25 μm to 65 μm.

In one aspect, the heat resistant material comprises nylon particles having a mean particle size of 25 μm to 60 μm.

In one aspect, the heat resistant material comprises nylon particles having a mean particle size of 30 μm to 50 μm.

In one aspect, the heat resistant material comprises nylon particles having a melting point of 200° C. to 267° C.

In one aspect, the heat resistant material comprises nylon particles having a melting point of 257° C. to 267° C.

In one aspect, the resin is present in the composition in an amount of 1.0 wt % to 60 wt %.

In one aspect, the resin is present in the composition in an amount of 10 wt % to 40 wt %.

In one aspect, the solvent is present in the composition in an amount of 5.0 wt % to 70 wt %.

In one aspect, the solvent is present in the composition in an amount of 20 wt % to 60 wt %.

In one aspect, the heat resistant material is present in the composition in an amount of 0.1 wt % to 20 wt %.

In one aspect, the heat resistant material is present in the composition in an amount of 1.0 wt % to 10 wt %.

In one aspect, the heat resistant ink or coating composition further comprises an additive.

In one aspect, the heat resistant ink or coating composition further comprises a colorant.

In one aspect, the paper feel imparted by the coating is present after heat sealing or printing at temperatures greater than 120° C.

In one aspect, the substrate is a plastic material selected from polyethylene terephthalate, nylon, cellophane, polypropylene, and glycine, among other materials.

In one aspect, described is a coated substrate comprising the inks and coatings as described herein that are applied to a substrate.

In one aspect, the coated substrate exhibits a gloss of 5-15 as measured on a 60° gloss meter.

In one aspect, described is a heat stamp foil comprising the coating as described herein applied to a foil substrate.

In one aspect, the heat resistant ink or coating composition is continuously applied, that is, it is applied continuously over the surface of the substrate.

In one aspect, the heat resistant ink or coating composition is applied at a coating weight of 0.65 grams/meter$^2$ (gsm) to 4.88 gsm.

In one aspect, the heat resistant ink or coating composition, when applied to a substrate, achieves a Sutherland rub test score of 1 to 5, preferably 1 to 4, with the score of 1 being best.

In one aspect, the heat resistant ink or coating composition, when applied to a substrate, achieves a contrast ratio of 9.1% to 11.5% when measured on an X-Rite spectralphotometer and depending on application method and weight.

In one aspect, the heat resistant ink or coating composition exhibits a viscosity of 33 seconds to 37 seconds as measured in a #2 EZ Zahn cup at 22° C.

In one aspect, described is a method of coating a substrate with a heat resistant ink or coating comprising:
  applying to a substrate, at a temperature of 120° C. or greater, a heat resistant ink or coating composition comprising resin, solvent and heat resistant particles;
  drying the coating;
  wherein the ink or coating composition imparts a feel to the substrate that is different from the feel of the substrate when the substrate is not coated.

In one aspect the ink or coating composition is an overprint varnish (OPV).

In one aspect, the haptic effect or tactile perception of touching and feeling paper is provided by the heat resistant material. In another aspect, the heat resistant material is nylon particles, which may be in the form of nylon beads. In another aspect, the nylon particles (e.g., beads) have a maximum particle size of 100 μm or less, preferably 90 μm or less, more preferably 80 μm or less, and even more preferably 75 μm or less.

In another aspect, the nylon particles have a mean particle size of 25 μm to 75 μm, preferably 25 μm to 65 μm, more preferably 25 μm to 60 μm, and even more preferably 30 μm to 50 μm.

In one aspect, the inclusion of a relatively small amount of the nylon particles in the ink or coating composition is sufficient to achieve the desired haptic effect and which are resistant to heat in that they do not break down when exposed to the heat associated with printing and application to a substrate ((≥120° C., preferably ≥200° C.).

The haptic effect or tensile perception experienced by an individual who touches feels a substrate coated with the described inks and coating is that of feeling paper.

In the past, paper-feel coatings have had limited application, especially on heat seal pouches and bags, because the haptic feel of the coating is lost in the heat seal area of the package. This results in locations where the bag feels like plastic instead of paper. The present application addresses this by providing a coating that will allow the entire area of the bag to have a consistent and uniform paper-like feel.

The present coatings can be used on, for example, pouches and bags having heat seals because of the excellent heat resistance that the coatings exhibit. The haptic or tactile perception of paper provided by feel of the coating is maintained in the heat seal area of the package, even after heat exposure, because the coating exhibits good heat resistance. The bag or pouch would thus feel like paper in the areas where it is coated.

DETAILED DESCRIPTION OF THE INVENTION

The heat resistant material, e.g., nylon particles (e.g., nylon beads) included in the inks and coatings described herein have a melting point that are high enough avoid degradation at temperatures of 120° C. or greater, which are temperatures at which heat stamping and printing operations may take place. In one aspect the nylon particles have a melting point of 200° C. or greater, such as 200° C. to 257° C., and such as 200° C. to 267° C. That is, the particles do not melt when exposed to these temperatures, and thus the coatings feel like paper in the heat stamp areas. Further, the coating will not break down and will not mar at the high temperatures at which processes take place.

The Resin

The resin used in the ink or coating composition provides the coating with the adhesive properties needed to attach the ink or coating to the substrate. The resin also provides the coating composition with durability and toughness.

The resin is a heat resistant material, e.g., able to withstand temperatures of 120° C. or greater. In addition to these properties, the resin must act as a carrier for the nylon particles (e.g., beads). In one aspect, the resin provides a surrounding medium for the nylon bead material, which does not appreciably shed or lose the nylon bead material, such as during the transfer to the substrate in the printing operation.

The amount of resin present in the ink or coating compositions is 1.0 wt % to 60 wt %, preferably 10 wt % to 40 wt %, based on the total composition of the ink or coating composition. In one aspect, the resin is epoxy, nitrocellulose, polyurethane, urea formaldehyde, acrylic, cellulose acetate butyrate (CAB), rosin (e.g., hydrogenated rosin and non-hydrogenated rosin) and combinations thereof. Other heat resistant materials may also be used.

Preferably, the resin provides a clear appearance when coated.

The Solvent

The solvent aids in adjusting the viscosity of the ink or coating to a value or range of values that renders the ink or coating composition printable. The solvent should also evaporate out of the ink or coating composition when exposed to heat during the printing process.

It should be understood that the amounts of the components given in this disclosure include the solvent component, that is, before the solvent is removed by the heat present in the printing or other application process.

The solvent may be included in the ink or coating composition in an amount of 5.0 wt % to 50 wt %.

Solvents may be alcohols and acetates, such as ethanol, n-propanol, isopropanol, n-propyl acetate and ethyl acetate, among others. Slow solvents may also be used. Suitable slow solvents include glycol ethers such as propylene glycol methyl ether, butyl cellosolve glycol ether, dipropylene glycol n-butyl ether. Other slow solvents include 2-methoxy-1-methylethyl acetate and ethoxy propanol.

Heat Resistant Material

The heat resistant material may be a nylon material that provides heat resistance and which does not degrade when exposed to temperatures of 120° C. or greater. The heat resistant material should not be soluble in the resin and solvent.

In one aspect, the nylon material is nylon 66. This material has a melting point considerably higher than 200° C. Other nylon materials may be used as the heat resistant material, such as nylon 6, nylon 610, nylon 612, all of which have melting points above 200° C. Combinations of nylons may be used.

In the present disclosure, the terms "nylon" and "polyamide" are used interchangeably.

In one aspect, the nylon material is in the form of a bead having a maximum particle size of 100 μm or less, preferably a size of 0.1 μm to 90 μm, more preferably 10 μm to 80 μm, even more preferably 10 μm to 75 μm. In another aspect, the nylon particles have a mean particle size of 25 μm to 75 μm, preferably 25 μm to 65 μm, more preferably 25 μm to 60 μm, and even more preferably 30 μm to 50 μm.

In one aspect, the heat resistant material is one or more of the products available under the tradename NyloTex® from MicroPowders, Inc., Tarrytown NY US. The NyloTex® products are described as micronized nylon 66 having a melting point of 257° C. to 267° C., a density of 1.14 g/cc at 25° C., and a moisture content of less than 4%. The NyloTex® 200 product (micronized nylon 66) is particularly well suited from use in the described ink or coating compositions. This product has a maximum particle size of 74 μm (200 mesh) and a mean particle size of 30 μm to 50 μm.

The amount of heat resistant material (e.g., nylon particles) is 1.0 wt % to 20 wt %, based on the total weight of the composition. Preferably, the amount is 1.0 wt % to 15 wt %, more preferably 1.0 wt % to 10 wt %, and even more preferably 1.0 wt % to 1.5 wt %.

The nylon particles (e.g., beads) described herein are responsible for the paper feel imparted by the ink or coating. That is, when inks and coatings containing the described nylon particles are coated on a substrate and dried, the coated substrate feels like paper, even when the substrate is a material other than paper, such as a plastic material. This results in an a pleasant sensory experience by the individual who is handling or otherwise touching the coated substrate, which as indicated above, may be formed into packaging materials that include heat sealed regions.

The inventors have found that the amount of nylon bead material included in the compositions is an important consideration. The amounts described lead to coatings in which the bead material is well integrated into the resin-solvent mixture. That is, the particles do not separate out of the composition.

The particle size is also of importance, as the described particle size aids in imparting the paper feel. These features may not be obtained if the particles are too large.

Additives

Other additives may be included in the composition. For example, as with most ink and coating compositions, additives may be incorporated to enhance various properties. Such additives include but are not limited to adhesion promoters, silicones, light stabilizers, optical brighteners, de-gassing additives, ammonia, flow promoters, defoamers, antioxidants, stabilizers, surfactants, dispersants, plasticizers, rheological additives, waxes, silicones, slip, scuff, antiblock and matte additives.

Additives can be included in amounts of 0.1 wt % to 25 wt %, preferably 1.0 wt % to 15 wt %, more preferably 5.0 wt % to 15 wt %, based on total composition weight.

Slip, scuff, anti-block and matte additives may include polyethylene, polypropylene, uracamides, steramide, Teflon, and natural and synthetic waxes. Also, silicones and fused silicas can be added for rub, slip and matte effects.

A low gloss is usually preferred in association with a coating that imparts a paper feel, since uncoated paper typically has low gloss. In a preferred embodiment, the coatings of the present invention have a gloss of 5-15 when applied at 1.0 lbs./ream and measured on a 60° gloss meter. A matte producing additive may aid in attaining a desirable amount of gloss.

Colorants may be included in the compositions to provide colored inks. Colorants, if present, may be present in an amount of 0.1 wt % to 20 wt %, based on the total weight of the composition. The colorants may be organic and inorganic pigments and dyes.

Suitable colorants include but are not limited to organic or inorganic pigments and dyes. The dyes include but are not limited to fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The colorant employed in the present invention may be any FD&C or D&C pigment. Preferred FD&C pigments include FD&C Red No. 40, FD&C Yellow No. 5, FD&C Yellow No. 6 and FD&C Blue No. 1. Preferred D&C pigments include D&C Red No. 6, D&C Red No. 7, D&C Red No. 21, D&C Red No. 22, D&C Red No. 27, Red No. 28, D&C Red No. 30, D&C Red No. 33, D&C Red No. 34, D&C Red No. 36, D&C Orange No. 5 and D&C Yellow No. 10.

The compositions can be prepared, for example by mixing the components on a high sheer cowls blade mixer for 20-45 minutes while generating minimal heat.

In one aspect, the ink or coating compositions are applied at a coating weight of 0.65 gsm to 4.88 gsm. The higher the application weight, the more robust and courser the paper feel. By adjusting the applied coating weight, the feel of many different kinds of paper can be reproduced. For example, to provide the feel of smooth paper, such as a polished or machined paper, low (e.g., light) coating weights are preferred. To provide the feel of a rough-surfaced paper, high (e.g., heavy) coating weights are preferred.

With a very high coating weight, at or around 4.88 gsm, a very gritty feel much like a sandpaper can be achieved.

In one aspect, the inventive ink, coating, overprint varnish is printed by flexography, roto-gravure, rod coating or other liquid ink application method.

In another aspect, the substrate that receives the coating is a heat resistant plastic material, such as, for example, polyethylene terephthalate (PET) or nylon. When heat stamped at temperatures of 120° C. or greater, the stamp area retains its paper-like feel.

In a comparison conducted by an individual who touched and felt an uncoated plastic substrate and the same substrate to which the coating described herein was applied, the individual noted that the coated substrate provided a paper like feel, and that it was noticeably felt less smooth when compared to the feel of the uncoated substrate.

EXAMPLES

The following examples illustrate specific aspects of the present invention and are not intended to limit the scope thereof in any respect and should not be so construed.

Example 1—a Coating Composition Including Micronized Nylon 6,6 and Urethane-Based Resin

| Material | % | Description/Purpose |
|---|---|---|
| Nitrocellulose solution | 18.0 | Resin-Film former and durability |
| DSM Neorez ® U-392 | 9.0 | Resin-Film former and adhesion |
| Polyketone K-1717 HMP Solution | 15.0 | Resin-Modifier to improve hold out |
| n-propyl acetate | 17.0 | Solvent |
| ethanol | 25.0 | Solvent |
| Croda Polymer Crodamide SR Powder | 1.0 | Wax-Block resistance and slip |
| Dow Corning ® DC 200 | 0.8 | Silicone Slip and Scuff Resistance |
| SST-2 Tetraflour PO | 0.7 | PTFE (Teflon)-Heat resistance and slip |
| Munzing Ceretan MXD 3920 | 1.5 | Micronized wax-Scuff resistance |
| Micro Powders Inc. NyloTex ® 200 | 4.0 | Haptic Effect |
| Micro Powders Inc. Propylmatte 31 | 3.0 | Micronized polypropylene wax-Scuff and gloss. Imparts non-slip properties and a matte finish. |
| Huber Pergopak ® M5 | 3.0 | Additive-Gloss |
| Fuji Sylysia 320 | 2.0 | Additive-Gloss |
| Total | 100.0 | |

Polyketone K-1717 HMP Solution is a solution of aldehyde-ketone resin.
NeoRez ® U-392 is a liquid non-reactive plasticizing polyurethane polymer resin.
Dow Corning ® DC 200 is a clear silicone fluid added for anti-foam.
Crodamide SR is a primary amine providing anti-blocking at low temperatures.
Pergopak ® M5 is a polymethyl urea resin with reactive methylol groups.
Fuji Sylysia 320 is micronized synthetic amorphous silica-gel.
Examples 1-3 and the comparative example were prepared as indicated above.

Example 2—A Coating Composition Including Micronized Nylon 6,6 (2-Part Overprint Varnish)

| Material | % | Description/Purpose |
|---|---|---|
| Polyketone K-1717 HMP Solution | 25.0 | Resin-Film former and Cure control (crosslinkable) |
| Shamrock S-390-C Wax | 2.0 | Wax-Scuff Resistance |
| Micro Powders Propylmatte 31 | 3.0 | Non-skid Wax-Scuff and block resistance |
| DSM Neorez U-392 | 16.0 | Resin-Film former and adhesion |
| Allnex ® Cymel XW3106 | 12.0 | Resin-crosslinking, durability and chemical resistance |
| ethanol | 20.0 | Solvent |
| n-propyl acetate | 10.0 | Solvent |
| PPG Lo-Vel ® 66 | 8.0 | Additive-Gloss |
| NyloTex ® 200 | 4.0 | Haptic Effect |
| King Industries Nacure ® 5076 | 5.0 | Catalyst post-ad just prior to printing |
| Total | 100.0 | Before catalyst addition |

Shamrock S-390-C Wax is a spherical synthetic wax.
Allnex ® Cymel XW3106 is an alkylated high solids melamine crosslinking resin.
PPG Lo-Vel ® 66 is a silica flatting agent that reduces gloss.
NACURE ® 5076 is a strong acid catalyst based on DDBSA supplied at 70% active in Isopropanol. It is added to the composition just prior to printing. Thus, this composition is a 2-part coating composition.

Example 3—A Coating Composition Including Micronized Nylon 6,6 and Epoxy-Based Resin

| Material | % | Description/Purpose |
|---|---|---|
| Neorez ® U-471 | 28.7 | Resin-Film former and adhesion |
| Epotuf EA-6891 | 5.1 | Resin-Film former and durability |
| Ethanol | 40.5 | Solvent |
| n-Propyl Acetate | 12.7 | Solvent |
| Crodamide SR Powder | 0.8 | Wax-Slip and Scuff resistance |
| Dow Corning ® DC 200 | 0.8 | Silicone Slip and Scuff Resistance |
| SST-2 Tetraflour PO | 0.8 | PTFE (Teflon)-Heat resistance and slip |
| Ceratan MXD | 1.3 | Additive-Scuff resistance |
| NyloTex ® 200 | 4.2 | Haptic Effect |
| Pergopak M5 | 3.4 | Gloss |
| Sylysia 320 | 1.7 | Gloss |
| Total | 100.0 | |

Neorez ® U-471 is a non-tacky, hydroxyl functional aliphatic film forming polyurethane.
EPOTUF ® EA-6891 is epoxy ester resin.
Ceratan MXD is micronized wax preparation.

Comparative Example 3—Composition without Heat Resistant Nylon Particles

Comparative Example 3 is a composition that includes Decosilk® Art Trans 30, a urethane material that is included in the composition to provide a paper-like feel, but which does not exhibit the heat resistance of the Nylotex 200 material.

Test prints were made with a Harper QD Hand Proofer with a 18.5 BCM anilox which applied approximately 1.0-1.5 pounds per ream.

Coatings are applied on a heat resistant PET film and folded over so that the coating is in contact with itself. The print is wrapped in aluminum foil and then placed between the jaws of the heat sealer set at 400° F./40 PSI/1 second dwell time. Once heat sealed, the print is removed from both the machine and the foil and the heat seal area is compared to the non-heat sealed area and evaluated for paper feel. Heat resistance was tested on a Sencorp Model number 12-ASL Laboratory Heat Sealer.

TABLE 1

Paper Feel Results of Prints

| Example | Paper Feel scale* before heat seal | Paper Feel scale* after heat seal |
|---|---|---|
| Comp. Ex 3 | 6.0-6.5 | 0 (Feels same as uncoated film) |
| Inv. Ex 3 | 9.5-10.0 | 9.5-10.0 |
| Inv. Ex 1 | 8.5-9.0 | 8.5-9.0 |
| Inv. Ex 2 | 7.0-7.5 | 7.0-7.5 |

*Paper feel scale runs from 0-10. A score of zero reflects no paper feel is experienced and a score of ten reflects a paper feel that is indistinguishable from raw uncoated paper (retains the paper feel of the uncoated paper). This score is established by feeling the finished print and comparing the feel to uncoated paper and assigning a score of 0-10, in a range of 0.5 increments.

As can be seen in Table 1, the inventive coatings were effective in retaining the paper feel after heat sealing, while the comparative example lost its paper feel after heat sealing.

Sutherland Rub Testing

The rub resistance exhibited by a coating is an important consideration. Printed articles and other materials are transferred through a number of processing steps, such as printing, slitting, laminating, pouch making, and product filling, and then there are additional steps after entering the stream of commerce and traveling to the end destination. The printed article is subjected to wear during these steps, and the coating could deteriorate if it is not durable enough. That is, the coating could mar and be completely or partially removed from the substrate.

Sutherland rub testing is one manner of conducting rub testing to assess the durability of a coating. The coating is applied on the target substrate and dried. Pieces of the print are cut and applied to the top and bottom portion of the tester and rubbed face to face with a 4-pound weight and evaluated for print marring.

Rub testing was conducted with a Sutherland Rub tester model 1000 set at the highest speed setting. Prints were prepared and dried from the composition of Example 1 and were rubbed face to face for a varying amount of cycles. Print substrate was PET film. One cycle equals one back and forth stroke or two rubs. The prints are visually evaluated periodically. The test is conducted until the breaking point is of the prints are reached. Example 1 reached a breaking point at 500 cycles (1,000 rubs), which is a very robust result for a coating, and would be expected to be higher than for a conventional paper-feel coating.

On a scale of 1 to 10, with 1 being nominal wear and 10 being complete removal and/or destruction of the coating, a score of 5 would be considered the point at which the coating begins to show a significant level of wear. This is the level at which defects in the coating become noticeable. A Sutherland rub test score of 1 to 5 is acceptable. The prints made from Example 1 achieved a score of 2, which is very good if not excellent.

Stability Testing

Coating stability is an important consideration. If the viscosity of the coating rises over time due to instability, then a larger addition of solvent would be needed to reduce the ink or coating to an acceptable print viscosity. The extra added solvent will reduce the applied solids, and thus reduce the overall performance of the coating.

The initial viscosity of Example 1 (R4108-27-A) was 35 seconds, as measured using a #2 EZ Zahn cup at 22° C. After 14 days stored at 49° F., it was measured at 36 seconds in the #2EZ Zahn cup at 22° C. This demonstrates excellent temperature and age stability.

Transparency

An overprint varnish should exhibit good transparency. If an overprint varnish is opaque, it may mute or alter the colors of the inks applied underneath it.

Transparency is tested using the contrast ratio on the X-Rite. The X-Rite measures contrast ratio as a percentage. The lower the percentage of contrast ratio, the more transparent the coating.

Example 1 and a comparative transparent matte coating were applied to PET treated film at 1.50 gsm.

Example 1 exhibited a contrast ratio of 10.30%, which is sufficiently transparent for a matte coating (less than 15% is considered above average (e.g., 1.0% to 15%), though the lower the score the better). The comparative matte coating exhibited a contrast ratio of 13.66%, or in other words, it is 24.59% more opaque than Example 1.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A heat resistant ink or coating composition comprising resin, solvent and a heat resistant material comprising nylon particles, characterized in that application of the ink or coating composition on a plastic substrate, imparts the plastic substrate a feel of paper, wherein:
   the nylon particles have a mean particle size of 30 μm to 100 μm;
   a feel of paper is the haptic effect or tactile perception of touching and feeling paper;
   the heat resistant material is not soluble in the resin and solvent;
   the ink or coating composition does not degrade upon exposure to temperatures of 120° C. or greater; and
   the feel of paper imparted by the coating is maintained after heat sealing or printing at temperatures greater than 120° C.

2. The heat resistant ink or coating composition of claim 1, wherein the ink or coating composition does not degrade upon exposure to temperatures of 120° C. to at least 267° C.

3. The heat resistant ink or coating composition of claim 1, wherein the heat resistant material comprises particles of nylon selected from nylon 6 particles, nylon 66 particles, nylon 610 particles, nylon 612 particles, and combinations thereof.

4. The heat resistant ink or coating composition of claim 1, wherein the nylon particles have a maximum particle size of 75 μm to 100 μm.

5. The heat resistant ink or coating composition of claim 4, wherein the heat resistant material comprises nylon particles having a mean particle size of 30 μm to 75 μm.

6. The heat resistant ink or coating composition of claim 1, wherein the heat resistant material comprises nylon particles having a melting point of 200° C. to 267° C.

7. The heat resistant ink or coating composition of claim 1, wherein the resin is present in the composition in an amount of 1.0 wt % to 60 wt %.

8. The heat resistant ink or coating composition of claim 1, wherein the solvent is present in the composition in an amount of 5.0 wt % to 70 wt %.

9. The heat resistant ink or coating composition of claim 1, wherein the heat resistant material is present in the composition in an amount of 0.1 wt % to 20 wt %.

10. The heat resistant ink or coating composition of claim 1, further comprising an additive; and/or further comprising a colorant.

11. The heat resistant ink or coating composition of claim 1, wherein the composition achieves the following results upon application to a substrate:
  a Sutherland rub test score of 1 to 5; and/or
  a contrast ratio of 1.0% to 15%; and/or
  a gloss of 5-15 as measured on a 60° gloss meter.

12. The heat resistant ink or coating composition of claim 1, wherein the heat resistant ink or coating composition exhibits a viscosity of 33 seconds to 37 seconds as measured in a #2 EZ Zahn cup at 22° C.

13. A coated substrate comprising the coating composition of claim 1 applied to the substrate.

14. The coated substrate of claim 13, wherein the substrate is a plastic material selected from polyethylene terephthalate, nylon, cellophane, polypropylene, and glycine.

15. The coated substrate of claim 13, wherein the coated substrate exhibits a gloss of 5-15 when measured on a 60° gloss meter; and/or wherein the coated substrate exhibits a Sutherland rub test score of 1 to 5; and/or wherein the coated substrate exhibits a contrast ratio of 1.0% to 15%.

16. The coated substrate of claim 15, wherein the heat resistant ink or coating composition is applied to a substrate at a coating weight of 0.65 to 4.88 grams/meter$^2$.

17. A heat stamp foil comprising the heat resistant ink or coating composition of claim 1 applied to a foil substrate.

18. A method of coating a substrate with a heat resistant ink or coating comprising:
  applying to a plastic substrate, at a temperature of 120° C. or greater, a heat resistant ink or coating composition comprising resin, solvent and heat resistant nylon particles, wherein the nylon particles have a mean particle size of 30 μm to 100 μm, wherein the ink or coating provides heat resistance at temperatures of 120° C. or greater, and wherein the heat resistant material is not soluble in the resin and solvent; and
  drying the coating;
  wherein the ink or coating composition imparts a feel of paper to the substrate, wherein a feel of paper is the haptic effect or tactile perception of touching and feeling paper, and wherein the paper feel imparted by the coating is maintained after heat sealing or printing at temperatures greater than 120° C.

19. The method of claim 18, wherein the ink or coating provides heat resistance at temperatures of 120° C. to at least 267° C.

* * * * *